United States Patent
Igarashi et al.

(10) Patent No.: US 7,433,212 B2
(45) Date of Patent: Oct. 7, 2008

(54) SYSTEM LINKING APPARATUS FOR GENERATED ELECTRIC POWER

(75) Inventors: Seiki Igarashi, Saitama (JP); Yoshiyuki Uchida, Zushi (JP); Ryuichi Shimada, Tokyo (JP)

(73) Assignees: Fuji Electric Device Technology Co., Ltd., Tokyo (JP); Tokyo Institute of Technology, Tokyo (JP)

( * ) Notice: Subject to any disclaimer, the term of this patent is extended or adjusted under 35 U.S.C. 154(b) by 131 days.

(21) Appl. No.: 11/258,389

(22) Filed: Oct. 26, 2005

(65) Prior Publication Data

US 2006/0114696 A1 Jun. 1, 2006

(30) Foreign Application Priority Data

Nov. 12, 2004 (JP) ............................. 2004-329624

(51) Int. Cl.
*H02M 5/45* (2006.01)
(52) U.S. Cl. .............................. 363/37; 363/68; 363/71; 363/132
(58) Field of Classification Search ................ 363/132, 363/34, 35, 36, 37, 8, 65, 66, 67, 68, 69, 363/70, 71, 73, 74
See application file for complete search history.

(56) References Cited

U.S. PATENT DOCUMENTS

| | | | | |
|---|---|---|---|---|
| 4,783,728 A * | 11/1988 | Hoffman | ...................... | 363/37 |
| 6,680,856 B2 * | 1/2004 | Schreiber | ...................... | 363/71 |
| 6,940,735 B2 * | 9/2005 | Deng et al. | ...................... | 363/37 |
| 7,135,835 B2 * | 11/2006 | Yamada et al. | .............. | 318/800 |
| 7,203,078 B2 * | 4/2007 | Datta et al. | .................... | 363/37 |

FOREIGN PATENT DOCUMENTS

JP 2897208 3/1999
WO WO 2004/017151 A1 2/2004

OTHER PUBLICATIONS

Katsuhiro Shinada et al., "AC-DC converter using a Power-MOSFETs based Bi-directional current switch with snubber regeneration," Mar. 21, 2000, IEE Japan No. 4-017, p. 1380.*
Shimada Ryuichi, Patent Abstracts of Japan, "Forward- and Backward-Current Switch Regenerating Snubber Energy", Publication No. 2000-358359, Publication Date: Dec. 26, 2000.

(Continued)

*Primary Examiner*—Jeffrey L. Sterrett
*Assistant Examiner*—Stuart Hansen
(74) *Attorney, Agent, or Firm*—Staas & Halsey LLP (57) ABSTRACT

A system linking apparatus for generated electric power which may be made smaller and more efficient. The system linking apparatus is intended for connecting an electric power system to an output of a power generator through a linking inverter (PWM inverter). The system linking apparatus includes a magnetic energy regenerating circuit, a diode rectifier, and a capacitor. The magnetic energy regenerating circuit has a capacitor for condensing magnetic energy condensed in the power generator. The diode rectifier is connected with the magnetic energy regenerating circuit and operates to dc convert electric power generated by the power generator and output the converted power to the linking inverter. The capacitor is connected with the diode rectifier and operates to keep a dc output to the linking inverter at a predetermined voltage.

8 Claims, 8 Drawing Sheets

OTHER PUBLICATIONS

Shimada Ryuichi, et al., Patent Abstracts of Japan, AC Power Supply Regenerating Magnetic Energy, Publication No. 2004-260991 and Publication Date: Sep. 16, 2004.

Katsuhiro Shinada et al., "AC-DC Converter Using A Power-MOSFETs Based Bi-directional Current Switch With Snubber Regeneration," Transactions of IEE Japan No. 4-017, p. 1380, Mar. 21, 2000.

Isamu Nagata et al., "Development of Gearless Variable-Speed Wind Turbine," Technical Report of Mitsubishi Heavy Industry, Ltd., vol. 38, No. 2, pp. 100-103.

* cited by examiner

SYSTEM LINKING APPARATUS FOR GENERATED ELECTRIC POWER

CROSS-REFERENCE TO RELATED APPLICATIONS

This application is based upon and claims the benefits of priority from the prior Japanese Patent Application No. 2004-329624, filed on Nov. 12, 2004, the entire contents of which are incorporated herein by reference.

BACKGROUND OF THE INVENTION (1) Field of the Invention

The present invention relates to a system linking apparatus for generated electric power which is constructed to connect an electric power system to an output side of a power generator through a linking inverter. More particularly, the present invention relates to the system linking apparatus for generated electric power which does not suffer from increase of a current capacity of a converting device resulting from an inferior power factor caused by leakage inductance of a power generator.

(2) Description of the Related Art

Recently, aero generation that utilizes inexhaustible and regenerative energy, that is, wind power is rapidly prevailing worldwide as an environment-friendly power generation system. In such a wind-power generation system, today, attention is focused to a variable-speed technique that operates to greatly reduce an output variation of a power generator.

In a case that a power generator is driven by a windmill to be rotated by wind energy and electric power generated by the wind-power generator is regenerated in a commercial electric power system, it is necessary to reduce the generation cost and improve the reliability of the generation and further to obtain effective energy based on efficient regeneration of electric power. This kind of problem about the system linkage is disclosed in the Official Gazette of Japanese Patent No. 2897208. Further, the reduction of output variation, the reduction of rush current, the lowering of noise, and the amelioration of a maintenance capability are described in Isamu NAGATA, et al: "Development of Gearless Variable-speed Wind Turbine" (Technical Report of Mitsubishi Heavy Industry, Ltd., Vol 38, No. 2, pp. 100-103, March 2001).

Figure 4:
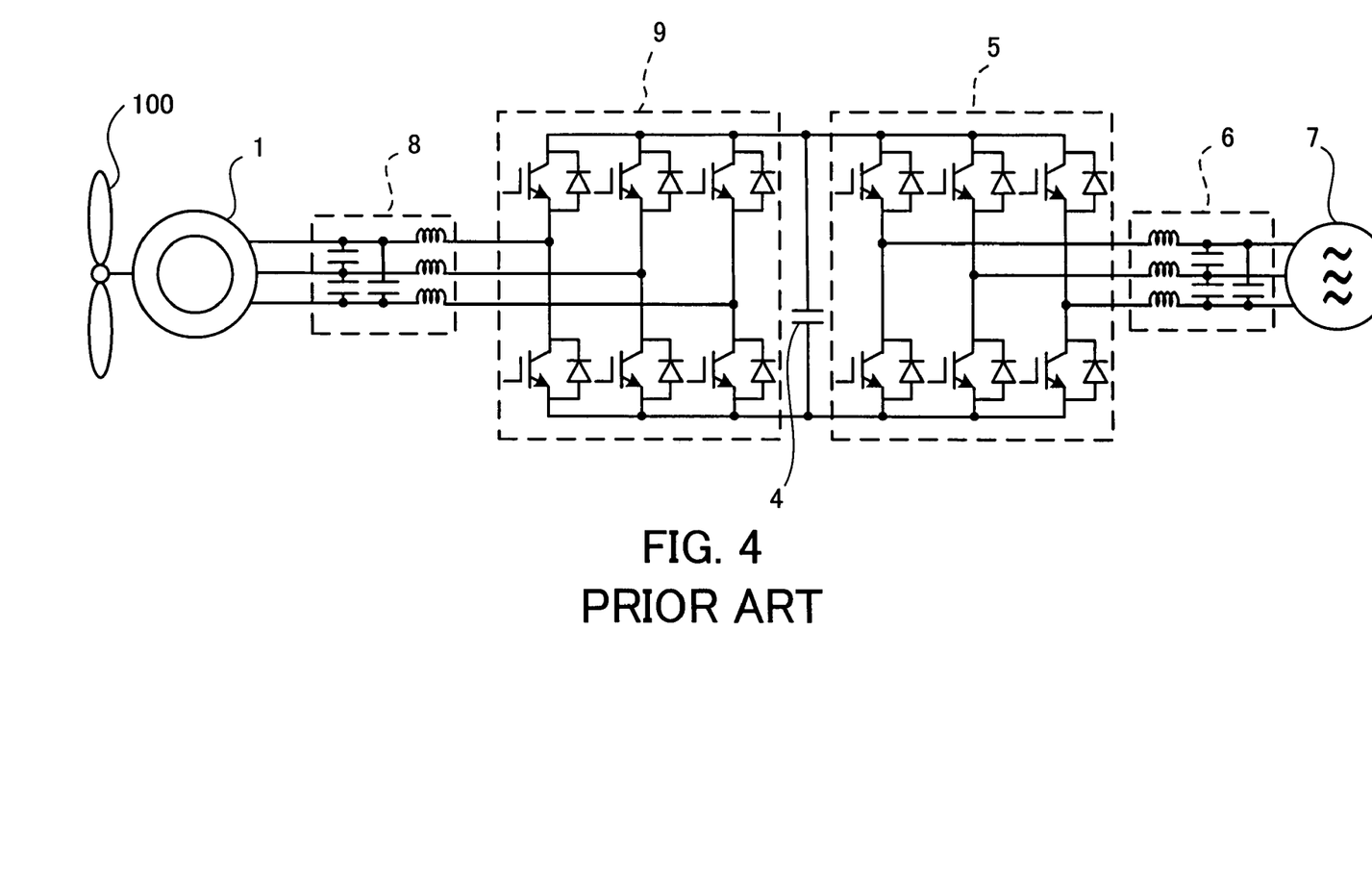
FIG. 4 is a circuit diagram showing an electric generating system for connecting an electric power system to the output of the conventional power generator through a linking inverter.

FIG. 4 is a circuit diagram showing a generation system which connects an electric power system to an output of the conventional power generator through a linking inverter. This generation system is constructed to have a generator 1 coupled with a rotation shaft of a propeller 100, a PWM rectifier 9 connected with the output side of the power generator 1 through a filter 8, a capacitor 4 and a PWM inverter 5 both of which are connected on the dc output side of the PWM rectifier 9, and a filter 6 connected between an output of the PWM inverter 5 and an electric power system 7. Herein, each of the PWM rectifier 9 and the PWM inverter 5 is composed of a three-phase bridge circuit having six switches, each of which is made up of an IGBT and a diode connected in inverse-parallel thereto.

Figure 5A:
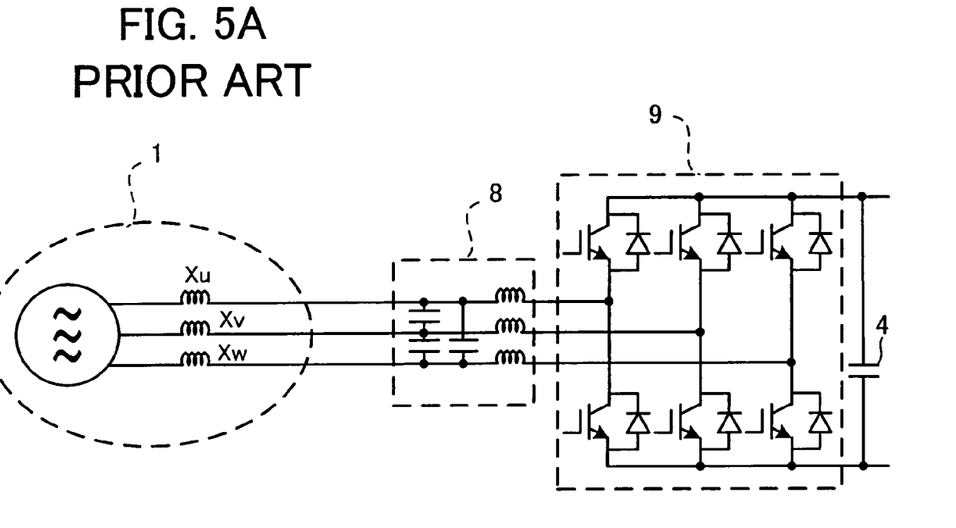
FIGS. 5A and 5B illustrate an arrangement of a converter included in the power generation system shown in FIG. 4 and its operating waveform.
Figure 5B:
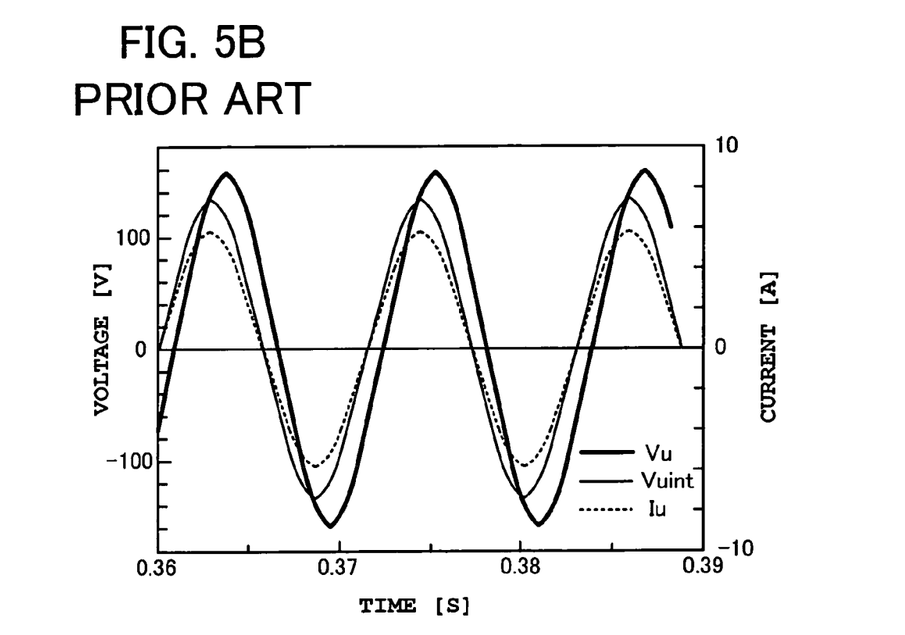
Figure 6:
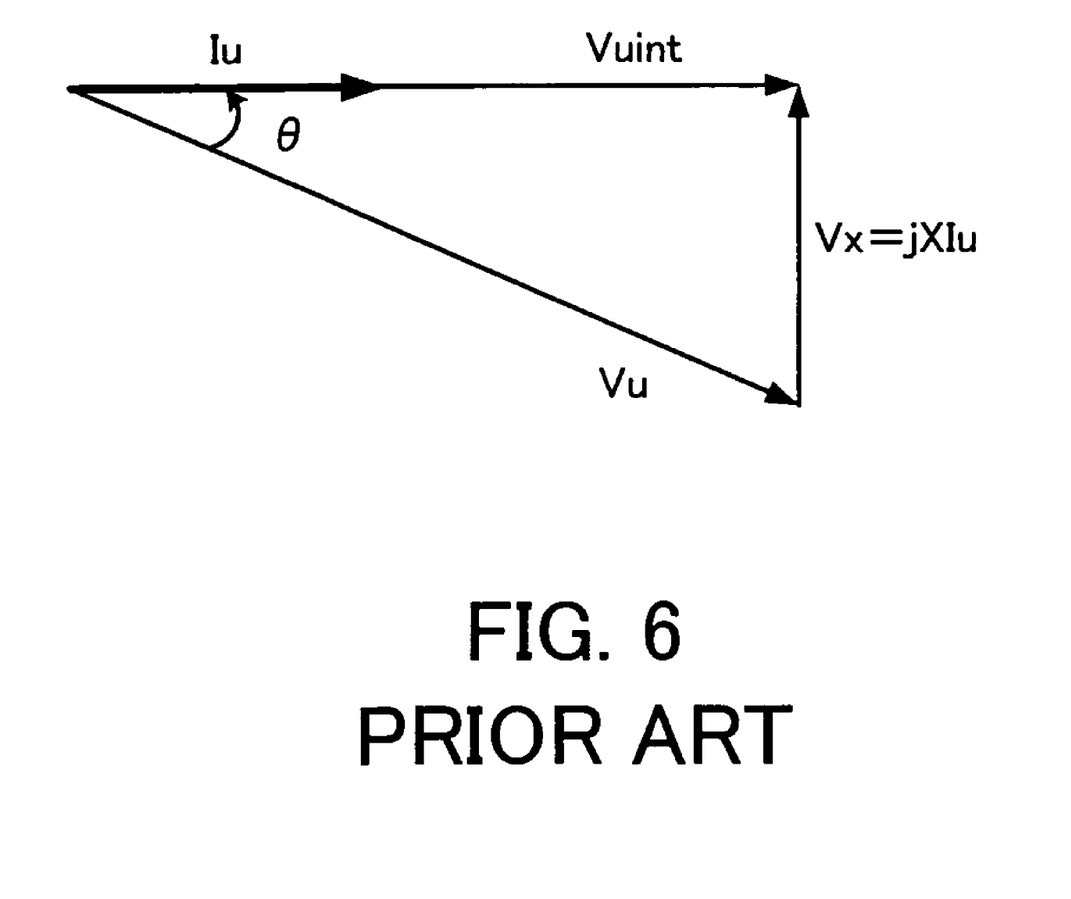
FIG. 6 is a Feather view showing relation between a voltage vector and a current vector in the power generator system shown in FIG. 4.

FIG. 5 shows an arrangement of a converter included in the power generation system shown in FIG. 4 and the operation waveform of the converter. FIG. 6 is a Feather view showing relation between a voltage vector and a current vector in the power generation system.

FIG. 5B shows the current and voltage waveforms appearing in the case of controlling an output voltage Vu of the PWM rectifier 9 to which an IGBT gate signal of the three-phase bridge circuit is supplied so that a power factor 1 may be derived from an armature voltage Vuint and an output current Iu of the power generator 1. The power generator 1 shown in FIG. 5A changes its terminal voltage according to a magnitude and a phase of current outputted from the power generator 1. Hence, in order to flow such current that the voltage Vuint of each armature winding and the output current of the power generator 1 are mixed into a power factor 1, it is necessary to output an output voltage Vu whose amplitude is larger than the voltage Vuint of the armature into the PWM inverter 5 by delaying the phase of the output voltage Vu.

In FIG. 6, the voltage Vx is a voltage generated by a leakage reactance X in the armature winding of the power generator 1. The magnitude of this voltage is determined by a product of the leakage reactance X and the output current Lu of the power generator.

Letting a control phase angle as θ, the output power $P_0$ of the power generator 1 is represented by the following expressions (1) and (2);

$$P_0 = 3 \cdot Vu \cdot Iu \cdot \cos\theta \quad (1)$$

$$P_0 = 3 \cdot Vuint \cdot Iu \quad (2)$$

And, $$\cos\theta = 1/\sqrt{1+x^2} \quad (3)$$

wherein x denotes a percent impedance of the leakage reactance X.

Hence, since the capacity of the PWM rectifier 9 is $3 \cdot Vu \cdot Iu$, the electric power outputted by the power generator 1 is required to be $\sqrt{1+x^2}$ times as large as that provided in the case that the power factor is 1. Hence, the capacity of the converter of the PWM inverter 5 is required to be $\sqrt{1+x^2}$ times as large as that provided in the case that the power factor is 1.

The PWM inverter 5 and the filter 6 control the output voltage in the phase synchronized with the electric power system 7, so that the electric power condensed in a capacitor 4 may be outputted to the electric power system 7. At a time, the PWM inverter 5 serves as a linking converter for controlling the phase and the voltage value of the output voltage. As such, the PWM inverter 5 controls a magnitude of an electric power to be outputted to the electric power system 7.

The conventional system linking apparatus requires the PWM rectifier 9 to have $(1+x^2)^{1/2}$ times as large a capacity. Hence, the PWM rectifier 9 is made larger in size. Further, since the PWM rectifier 9 needs to output $(1+x^2)^{1/2}$ times as large an output voltage Vu, the PWM rectifier 9 needs to be composed of a highly endurable semiconductor device. In general, therefore, a highly endurable semiconductor device brings about a larger conduction loss and switching loss than a low endurable semiconductor. These power losses bring about a difficulty in effectively obtaining energy.

Further, since the PWM rectifier 9 attenuates harmonic components of a carrier frequency, a filter 8 is required to be connected with the PWM rectifier 9. For reducing the filter 8 in size, in general, a high-frequency filter of several kHz or more is used. Hence, the PWM rectifier 9 disadvantageously brings about a larger switching loss and makes the system linking apparatus larger in size and more costly.

SUMMARY OF THE INVENTION

The present invention is made in consideration of those respects, and it is an object of the present invention to provide a system linking apparatus for a generated electric power which may be constructed in smaller size and more efficiently by including a magnetic energy regenerating circuit.

In carrying out the object, a system linking apparatus for generated electric power is provided for connecting an electric power system to the output side of a power generator through a linking inverter. This system linking apparatus for generated electric power comprises a magnetic energy regenerating circuit having a magnetic energy condensing capacitor for condensing magnetic energy condensed in the power generator, a rectifying circuit connected with the magnetic energy regenerating circuit and for converting electric power generated by the power generator into dc current and outputting dc current into the linking inverter, and a capacitor connected with the rectifying circuit and for keeping the dc output to the linking inverter at a predetermined voltage.

The above and other objects, feature and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
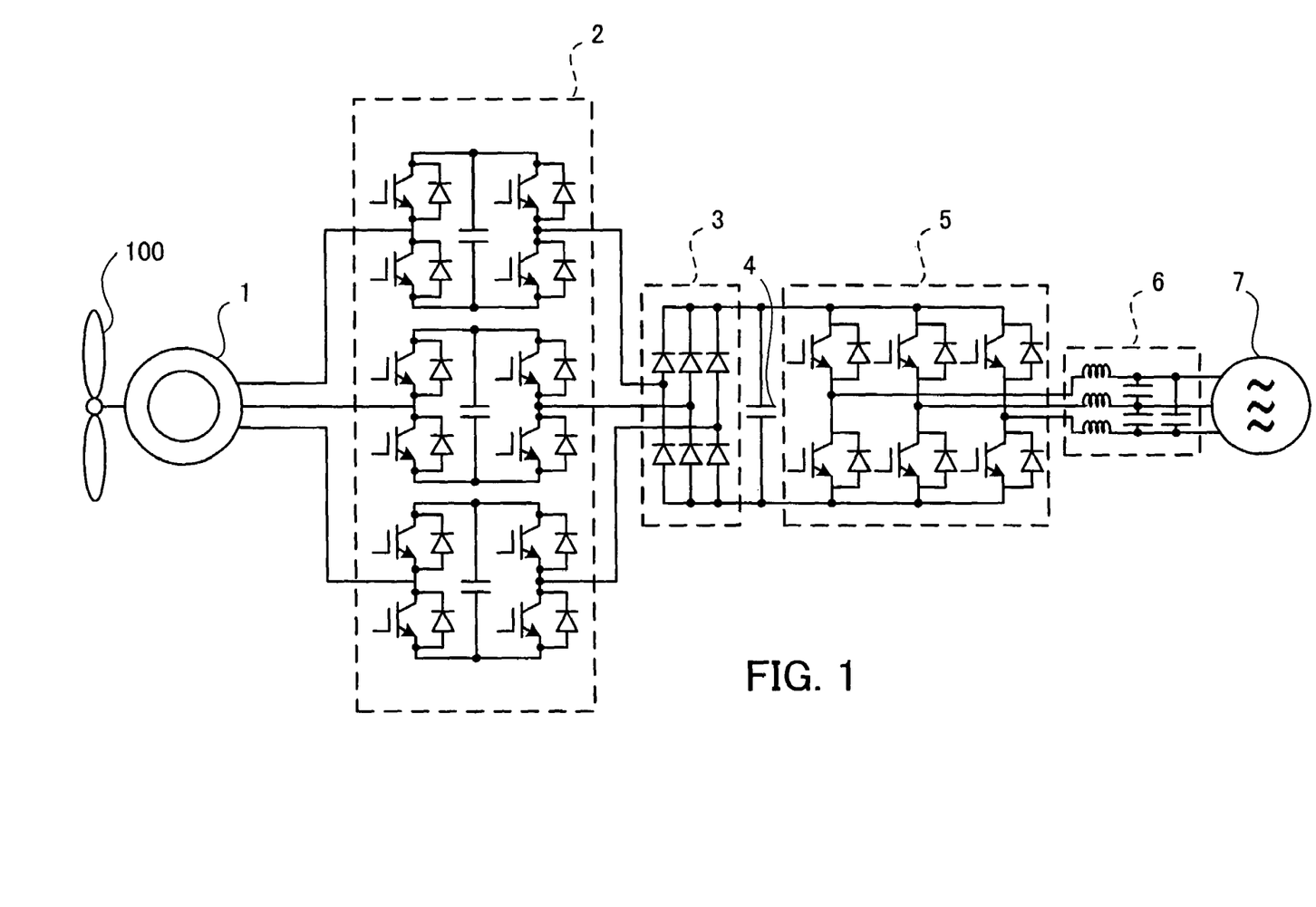
FIG. 1 is a circuit diagram showing a system linking apparatus according to an embodiment of the present invention.

Hereafter, the embodiment of the present invention will be described with reference to the appended drawings. FIG. 1 is a circuit diagram showing a system linking apparatus according to an embodiment of the present invention.

It is assumed that the system linking apparatus shown in FIG. 1 includes as a power generator 1 a synchronous generator directly driven by the rotation of a propeller 100. The output of the synchronous generator is connected with an electric power system 7 through a PWM inverter 5 served as a linking inverter. The difference between this system linking apparatus and the apparatus shown in FIG. 4 is as follows. First, instead of the PWM rectifier 9, a diode rectifier 3 composed of four diodes D1 to D6 is used. Second, a magnetic energy regenerating circuit 2 is located between the power generator 1 and the diode rectifier 3. The magnetic energy regenerating circuit 2 is made up of bridge circuits each of which is composed of four of reverse-conducting semiconductor switches SW1 to SW12 and has a capacitor Cu, Cv or Cw connected between its dc terminals. Those bridge circuits correspond with the phase outputs of the power generator 1 respectively. Herein, each of the reverse-conducting semiconductor switches SW1 to SW12 is composed of an IGBT and a diode connected in reverse-parallel to the IGBT. A capacitor 4 for keeping a dc output at a predetermined voltage, a PWM inverter 5, a filter 6, an electric power system 7, and the other components are identical with those shown in FIG. 4. Hence, the description about them is left out.

Figure 2:
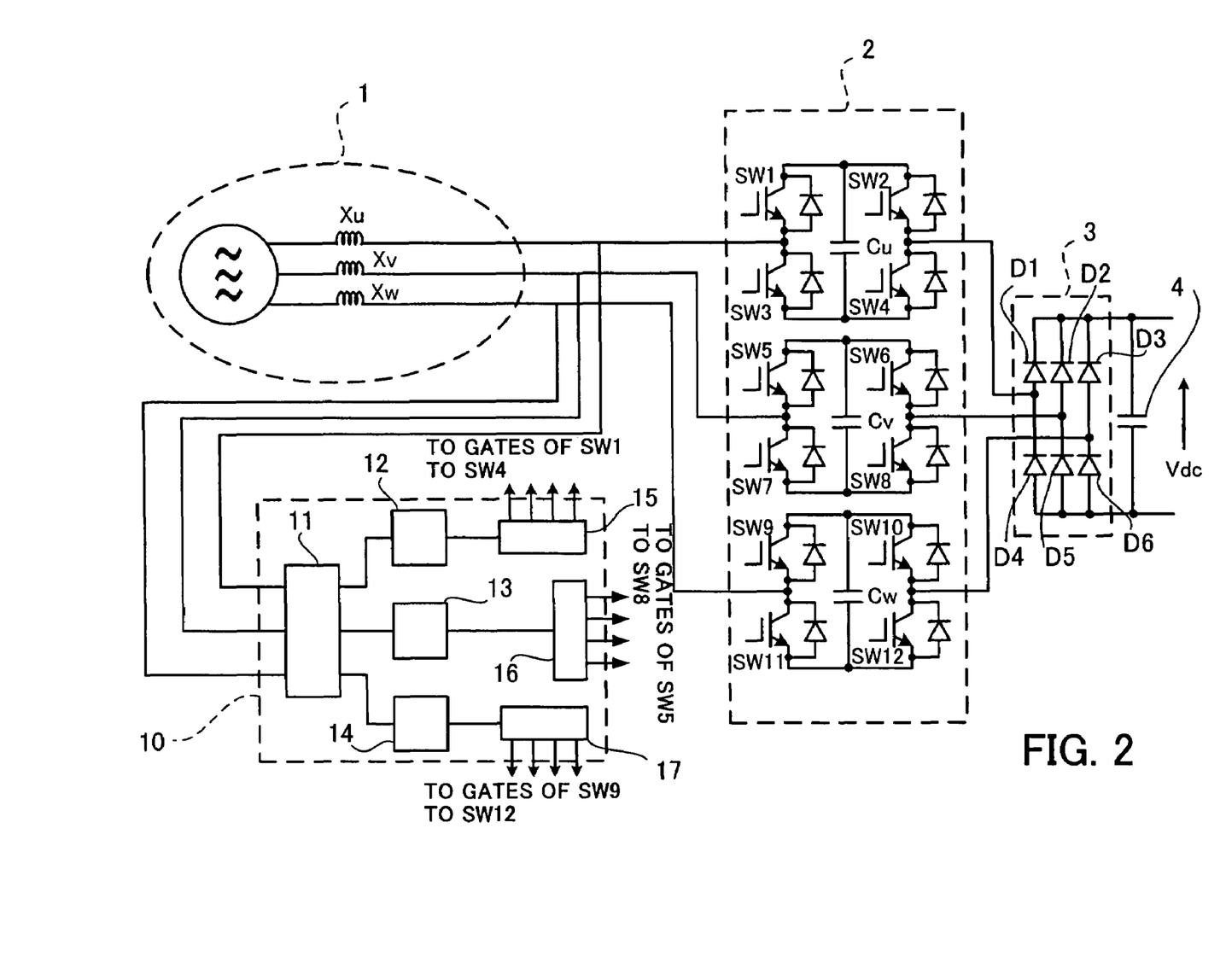
FIG. 2 illustrates a magnetic energy regenerating circuit and its peripheral circuits in details.

FIG. 2 illustrates the magnetic energy regenerating circuit in details.

The ac power generated in the power generator 1 is taken out of each armature winding Xu, Xv or Xw. The ac powers of these three phases are supplied to the magnetic energy regenerating circuit 2. The regenerating circuit 2 includes three bridge circuits each of which is composed of three reverse-conducting semiconductor switches SW1 to SW4, SW5 to SW8 or SW9 to SW12 and a capacitor Cu, Cv or Cw for condensing magnetic energy. The ac output from each bridge circuit is converted into a dc voltage through the diode rectifier 3 and then the ac voltage is held in the capacitor 4.

The magnetic energy regenerating circuit 2 is connected to a control circuit 10 for controlling on and off each reverse-conducting semiconductor switch SW1 to SW12 by supplying a control signal to the gate of each switch SW1 to SW12. This control circuit 10 is composed of a phase detector 11, pulse distributors 12, 13 and 14, and gate circuits 15, 16 and 17. The phase detector 11 is supplied with voltage phase signals sent from the armature windings Xu, Xc and Xw. Then, the pulse distributors 12, 13 and 14 generate the PWM pulse signals according to the phase difference signals of those phases, respectively. In response to those PWM pulse signals, the gate circuits 15, 16, 17 output gate drive signals on the timing synchronized with the output voltage frequency of the power generator 1 in a manner to switch on and off a pair of reverse-conducting semiconductor switches located on a diagonal of each bridge circuit at a time.

In turn, the description will be turned to the on-and-off control of the magnetic energy regenerating circuit 2.

First, the reverse-conducting semiconductor switches SW1, SW4, SW6 and SW7 are switched on so that the capacitor 4 may be charged with a dc voltage. At a time, the reverse-conducting semiconductor switches SW2, SW3, SW5 and SW8 are turned off. In actual, the capacitor 4 is supplied with current in the passage from the V phase of the power generator 1 to the armature winding Xv to SW5 to SW6 to the diode D2 to the capacitor 4. Next, the capacitor 4 flows out the same magnitude of current in the passage from the capacitor 4 itself to the diode D4 to SW4 to SW3 to the armature winding Xu to the U phase of the power generator.

Then, the reverse-conducting semiconductor switches SW1 and SW4 are turned off, so that the magnetic energy condensed in the armature winding Xu may be shifted to the capacitor Cu. That is, the magnetic energy is passed from the V phase of the power generator 1 to the armature winding Xv to SW5 to SW6 to the diode D2 to the capacitor 4 to the diode D4 to the SW2 to the capacitors Cu to the SW3 to the armature winding Xu to the U phase of the power generator 1.

When the polarity of the U-phase voltage of the power generator is reversed, the gate drive signals from the control circuit 10 are switched on the timing synchronized with the reverse, so that the reverse-conducting semiconductor switches SW2 SW3, SW5 and SW8 are turned on. Then, the magnetic energy condensed in the capacitor Cu is shifted to the capacitor 4. That is, the current is flown in the capacitor 4 in the passage of the capacitor Cu to the SW2 to the diode D1 to the capacitor 4, while the current is flown out of the capacitor 4 in the passage of the capacitor 4 to the diode D5 to the SW6 to the SW5 to the armature winding Xv to the V phase of the power generator 1 to the U phase of the power generator 1 to the armature winding Xu to the SW1 to the capacitor Cu. As such, large current is abruptly flown in the capacitor 4 by virtue of the voltage of the magnitude corresponding with the magnetic energy condensed in the capacitor Cu. This results in improving a power factor.

As described above, in the magnetic energy regenerating circuit 2, when the bridge circuit is turned off, the magnetic energy condensed in the leakage reactance X of the power generator 1 is put into the capacitor Cu, Cv or Cw, when the bridge circuit is turned on, the energy condensed in the capacitor is discharged into the capacitor 4 connected on the output side of the diode rectifier 3. The output current of the diode rectifier 3 abruptly rises when the bridge circuit is turned on. Hence, the current flowing through load is made larger, so that a large magnitude of current is allowed to flow at a low voltage. This thus results in improving the power factor.

Further, the magnetic energy regenerating circuit 2 processes only the corresponding capacity of energy with the leakage reactance X. Hence, the diode rectifier 3 served as the AC/DC converter merely needs to have x $(1+x^2)^{-1/2}$ times as large a capacity as the conventional PWM rectifier 9.

Moreover, the magnetic energy regenerating circuit 2 just causes the reverse-conducting semiconductor switches SW1 to SW12 to be switched in synchronous to the ac frequency of the power generator 1. This makes it possible for those switches SW1 to SW12 to be switched at a lower frequency than the conventional circuit. In this case, while a voltage is left in the capacitor 4, the control circuit 10 is required to control those reverse-conducting semiconductor switches SW1 to SW12 so that the pair of forward current semiconductor switches and the pair of reverse current semiconductor switches are not turned on at the same time.

Like the phase control of the conventional PWM rectifier 9, by causing the reverse-conducting semiconductor switches SW1 to SW12 composing the bridge circuits of the magnetic energy regenerating circuit 2 to be switched on and off as shifting the switching operation from the phase of an output voltage of the power generator 1, it is possible to adjust a voltage value held in the capacitor 4. For example, in the case of controlling the U-phase voltage, by shifting the phase in which the reverse-conducting semiconductor switches SW1 and SW4 or the switches SW2 and SW3 are turned on from the phase of the armature voltage Vuint, like the shift of the phase of the conventional thyristor rectifier (PWM rectifier 9), it is possible to adjust the voltage value of the capacitor 4.

By further advancing the phase of a gate drive signal of the control circuit 10, the phase of the flowing current is caused to be advanced, while by delaying the phase thereof, the current is caused to be reduced. Further, by delaying the phase by 180 degrees, the current is stopped. By turning off the reverse-conducting semiconductor switches SW1 to SW12 composing the bridge circuits of the magnetic energy regenerating circuit 2, the capacitors Cu, Cv and Cw are charged up to the peak voltage of the power generator 1, so that the electric power to be supplied to the capacitor 4 may be cut off. Therefore, this system linking apparatus may use the magnetic energy regenerating circuit 2 for cutting off the electric power system 7 or as a synchronous power-up switch.

Figure 3:
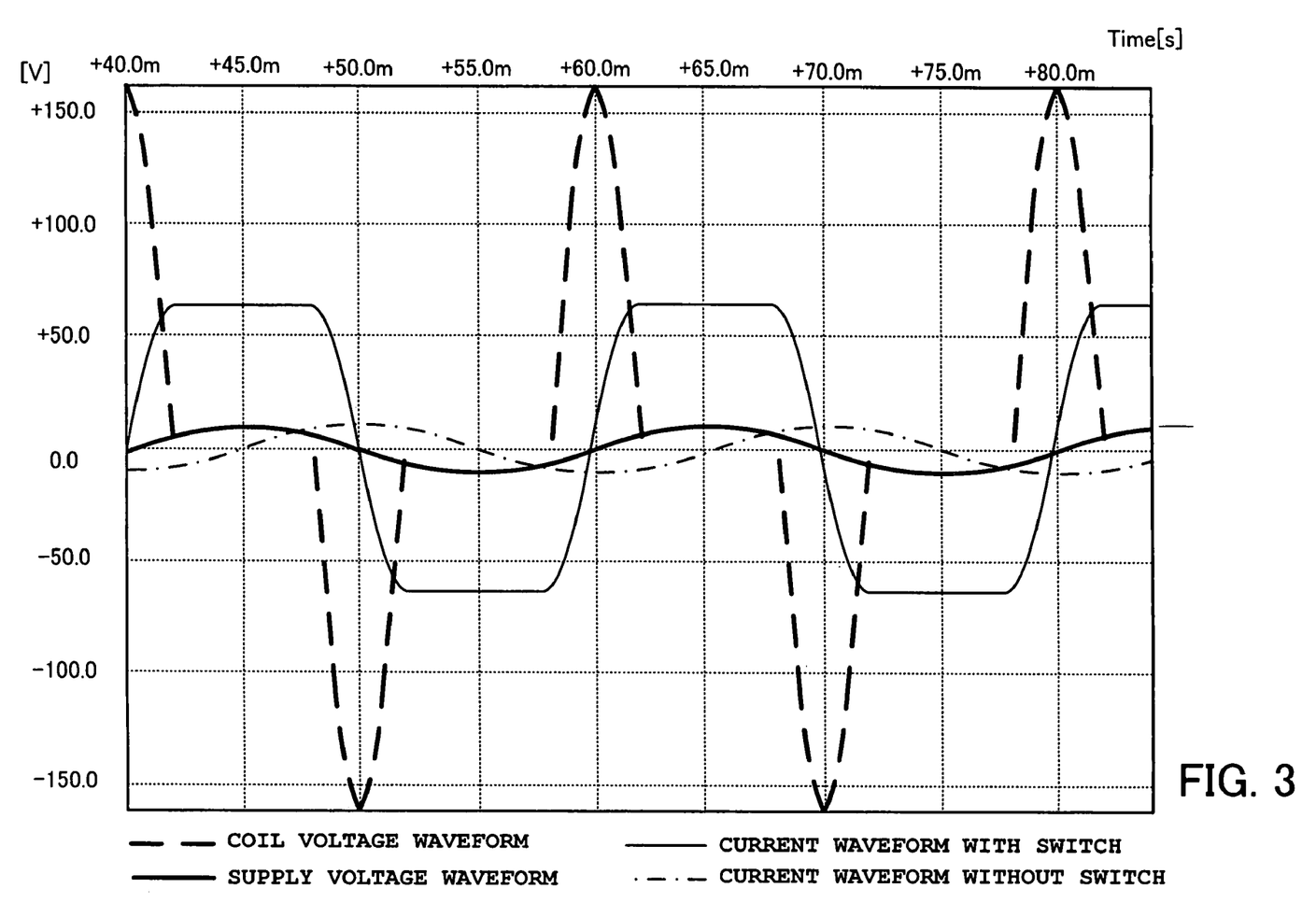
FIG. 3 illustrates a simulated result of current and voltage waveforms of the system linking apparatus shown in FIG. 1.

FIG. 3 illustrates the simulated result of the operation of the system linking apparatus. In FIG. 3, for the system linking apparatus provided with the magnetic energy regenerating circuit 2, it is understood that the current waveform with a switch has the same phase as the supply voltage waveform and further has a larger current value. This indicates an improved power factor of the load.

Hence, in a wide sense, this system linking apparatus is served as an apparatus of improving a power factor.

Figure 7:
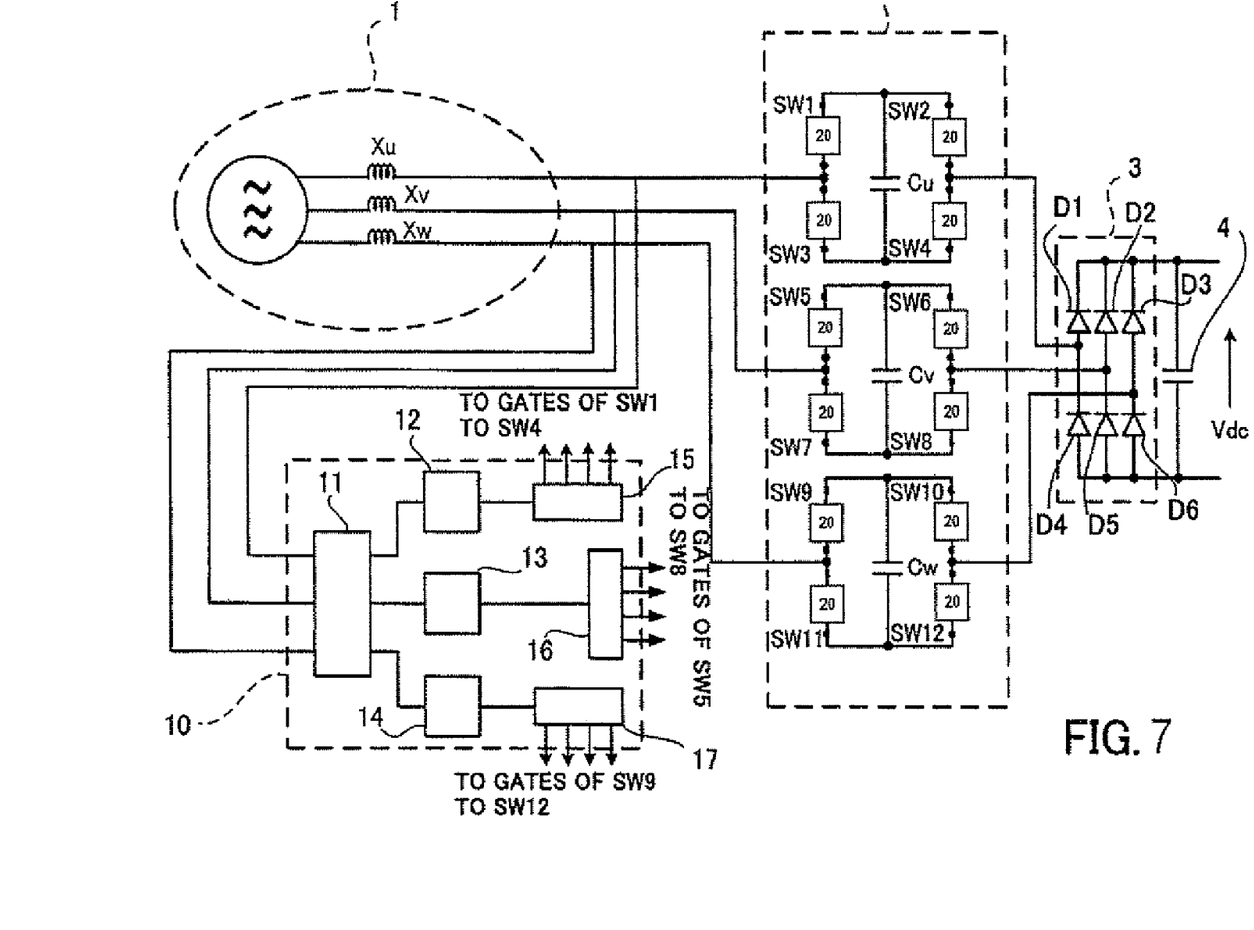
FIG. 7 illustrates an alternative embodiment of the magnetic energy regenerating circuit shown in FIG. 2.
Figure 8:
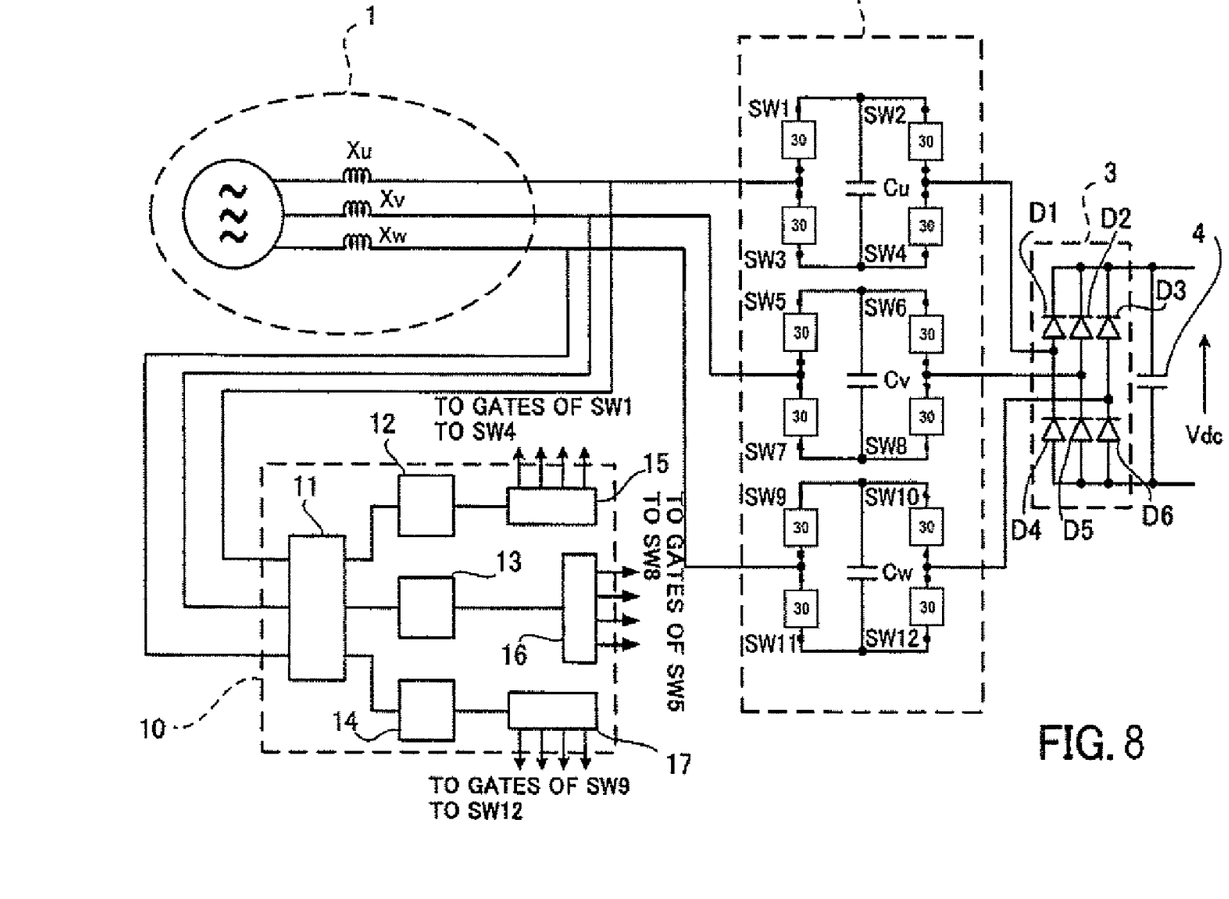
FIG. 8 illustrates an alternative embodiment of the magnetic energy regenarating circuit shown in FIG. 2.

The foregoing description has been concerned with the embodiment in which the reverse-conducting semiconductor switch is composed of a diode and an IGBT connected in parallel thereto. In actual, however, the reverse-conducting GTO thyristor 20 shown in FIG. 7 or the power MOSFET 30 shown in FIG. 8 may be used for the reverse-conducting semiconductor switch. This switch provides the same effect.

As set forth above, the system linking apparatus according to this embodiment is capable of improving a power factor of the power generator 1 through the use of the magnetic energy regenerating circuit 2 having the corresponding capacity with the leakage reactance X. Hence, this system linking apparatus may provide the converter which merely needs to have x $(1+x^2)^{-1/2}$ times as large a capacity as the conventional PWM rectifier. It means that the wind-power generation system may be reduced in size and made less costly. Though the conventional PWM rectifier is generally operated at several kHz, the system linking apparatus according to the present invention may be operated at the generator frequency of several tens Hz. This thus makes it possible to reduce the switching loss by a factor of 1/100 or less. This reduction results in making the system linking apparatus more efficient and smaller.

By controlling the on/off phase of the bridge circuit, it is possible to control the output voltage of the rectifier. Hence, this system linking apparatus may be operated without varying the output voltage even if the voltage of the power generator varies. Hence, the PWM inverter 5 that corresponds to the load of the magnetic energy regenerating circuit 2 is not required to be larger for coping with a variety of input voltage, which leads to reducing the apparatus in size.

Further, the magnetic energy regenerating circuit 2 may be used for cut off the power generator 1 from the electric power system 7 or a synchronous power-up switch. The system linking apparatus according to the present invention does not need to have mechanical switches such as a synchronous power-up conductor and a breaker that have been required by the conventional system. This leads to reducing the apparatus in size. Moreover, the magnetic energy regenerating circuit 2 enables to turn on or off more rapidly than the mechanical switches provided in the conventional system. This thus makes it possible to reduce the rush current appearing at turn-on.

According to the present invention, the magnetic energy regenerating circuit makes the power factor of the power generator 1 improved. This thus makes it possible to provide a system linking apparatus for a generated electric power which may be made smaller and more efficient. Further, the system linking apparatus of this invention does not need to have mechanical switches such as a synchronous power-up conductor or a breaker which have been required by the conventional system.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A system linking apparatus for generated electric power, for connecting an electric power system onto an output of a power generator through a linking inverter, comprising:

a magnetic energy regenerating circuit having a capacitor for condensing magnetic energy condensed in the power generator;

a rectifying circuit being connected with the magnetic energy regenerating circuit and for dc converting the electric power generated by the power generator and outputting the converted current onto the linking inverter; and a capacitor being connected with the rectifying circuit and for keeping the dc output for the linking inverter at a predetermined voltage, wherein:

the magnetic energy regenerating circuit includes bridge circuits each of which is composed of four reverse-conducting switches, the bridge circuits corresponding with outputs of respective phases of the power generator, and the magnetic energy condensing capacitor being connected between dc terminals of each of the bridge circuits;

when current to the rectifying circuit is cut off, the magnetic energy regenerating circuit causes magnetic energy condensed in leakage inductance of the power generator to be condensed in the magnetic energy condensing capacitor, and when a next switching operation is performed on the bridge circuits, the magnetic energy regenerating circuit causes the energy condensed in the magnetic energy condensing capacitor to be discharged into the capacitor that keeps the dc output at the predetermined voltage.

2. The system linking apparatus according to claim 1, further comprising:

a control circuit for generating a gate control signal for causing a pair of the reverse-conducting switches on a diagonal of four switches composing each bridge circuit to be switched on or off at a time, for controlling on or off the magnetic energy regenerating circuit through the gate control signal, and wherein the control circuit controls the switching operation in synchronous to an output voltage frequency of the power generator.

3. The system linking apparatus according to claim 2, wherein the control circuit keeps a dc voltage held in the capacitor constant by shifting the phase of an output voltage of the power generator from the switching operation.

4. The system linking apparatus according to claim 2, wherein the control circuit controls a cut-off speed between the power generator and the power system or a synchronous power-up speed.

5. The system linking apparatus according to claim 1, wherein the power generator is a synchronous generator directly driven by rotation of a propeller.

6. The system linking apparatus according to claim 1, wherein the reverse-conducting switch is made up of any one of a parallel connection of semiconductor switches each composed of a power MOSFET, a parallel connection of semiconductor switches each composed of a reverse-conducting GTO thyristor, and a parallel connection of a diode and an IGBT.

7. The system linking apparatus according to claim 1, wherein the reverse-conducting switches are controlled to be switched in synchronous with an output voltage frequency of the power generator.

8. A method of generating electric power, comprising:

connecting an electric power system onto an output of a power generator through a linking inverter;

providing a magnetic energy regenerating circuit having a first capacitor;

condensing magnetic energy condensed in the power generator with the first capacitor;

connecting a rectifying circuit to the magnetic energy regenerating circuit;

converting electric power generated by the power generator to direct current with the rectifier;

outputting the direct current to the linking inverter;

connecting a second capacitor to the rectifying circuit; and keeping the direct current output for the linking inverter at a predetermined voltage with the second capacitors;

wherein:

the magnetic energy regenerating circuit includes bridge circuits each of which is composed of four reverse-conducting switches, the bridge circuits corresponding with outputs of respective phases of the power generator, and the first magnetic energy condensing capacitor being connected between dc terminals of each of the bridge circuits;

when current to the rectifying circuit is cut off, the magnetic energy regenerating circuit causes magnetic energy condensed in leakage inductance of the power generator to be condensed in the first magnetic energy condensing capacitor, and when a next switching operation is performed on the bridge circuits, the magnetic energy regenerating circuit causes the energy condensed in the first magnetic energy condensing capacitor to be discharged into the second capacitor that keeps the dc output at the predetermined voltage.

* * * * *